Sept. 13, 1932.  A. B. SEPPMANN  1,877,367
PEDAL DEPRESSING MEANS FOR BRAKE TESTERS
Filed Oct. 15, 1928
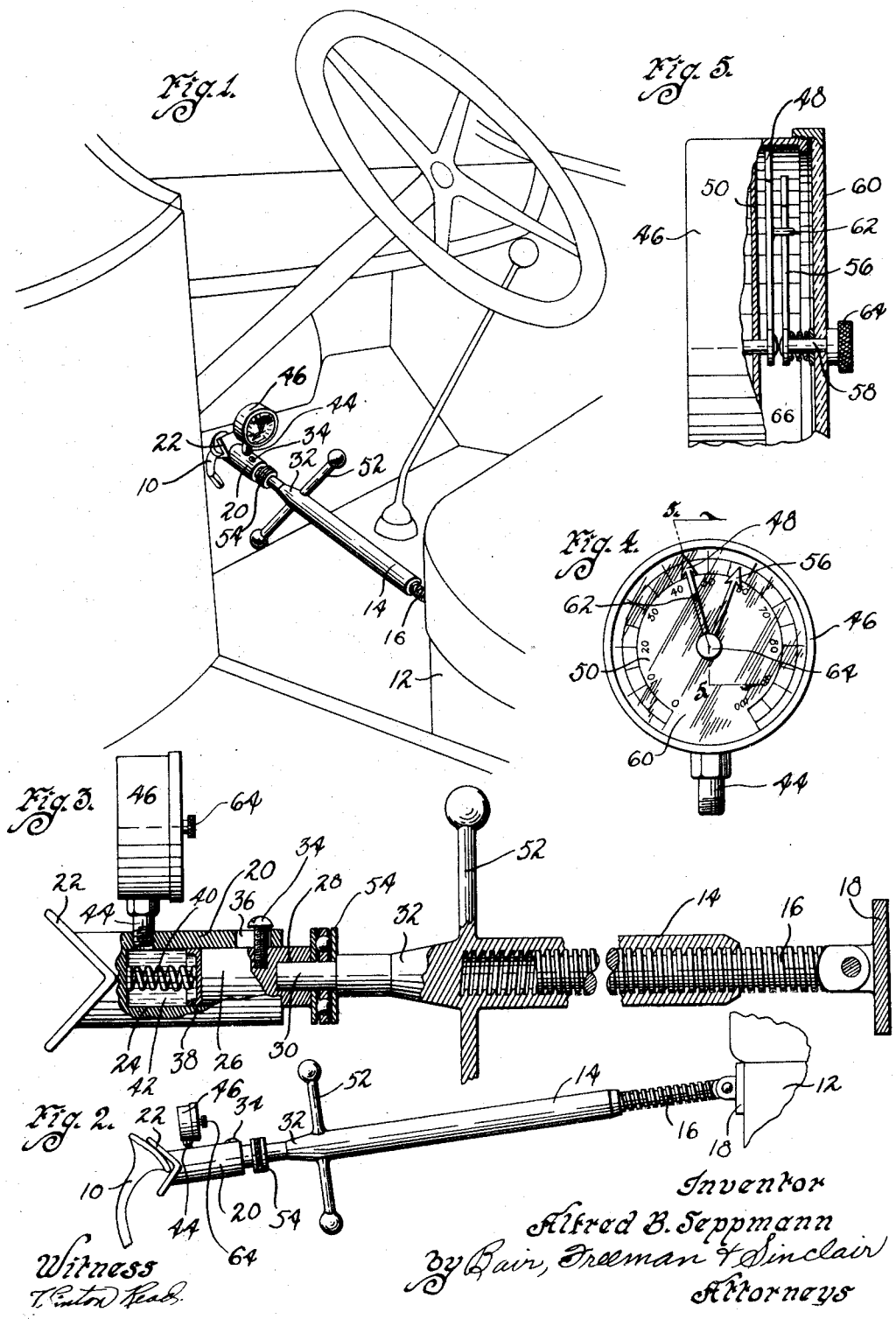
Inventor
Alfred B. Seppmann
By Bair, Freeman & Sinclair
Attorneys Patented Sept. 13, 1932

1,877,367

UNITED STATES PATENT OFFICE

ALFRED B. SEPPMANN, OF LAKE CRYSTAL, MINNESOTA

PEDAL DEPRESSING MEANS FOR BRAKE TESTERS

Application filed October 15, 1928. Serial No. 312,586.

The object of this invention is to provide an improved construction for a device for applying a predetermined pressure to the brake pedal of a motor vehicle and for maintaining such pressure during the operation of testing and adjusting the brakes.

A further object of the invention is to provide an improved extensible connection and operating means for a pedal depressing device.

Still another object of the invention is to provide an improved extensible pedal depressing means having in connection therewith, a pressure gauge device, which gauge device is equipped with a plurality of indicating means, one of which is pressure-operated and the other of which is advanced by the first mentioned indicating means for the purpose of showing loss of pressure during the testing operation.

Still another object of the invention is to provide an improved pedal depressing means including a hydraulic gauge with dual indicators, one of which is pressure-operated and the other of which is advanced by the advance movement of the first mentioned indicator to facilitate the operation of testing and adjusting brakes on both wheels of a pair and to insure that the brakes on both wheels are adjusted for the same pressure and braking effect.

Still another object of the invention is to provide a pedal depressing means especially adapted for use in testing the brakes of motor vehicles and which is of simple, durable and comparatively inexpensive construction.

With these and other objects in view my invention consists in the construction, arrangement and combination of the various parts of my device, whereby the objects contemplated are attained, as hereinafter more fully set forth, pointed out in my claims, and illustrated in the accompanying drawing, in which:

Figure 1 is a perspective view of a portion of the interior of a motor vehicle, showing my improved pedal depressor in position for actual use.

Figure 2 is a side elevation illustrating how the device is used.

Figure 3 is a sectional elevation of the device.

Figure 4 is a face view of a pressure gauge employed in connection with the device.

Figure 5 is an enlarged sectional view of the pressure gauge on the line 5—5 of Figure 4.

This invention relates to a pedal depressing means adapted for use in connection with brake testing apparatus of the character disclosed in my companion applications filed April 4, 1927, Serial Number 180,821, and filed July 11, 1928, Serial Number 291,823.

In order to enable the workman to efficiently and accurately test and adjust the brakes of motor vehicles, it is desirable to provide means for applying and holding a pressure on the brake pedal so that the testing and adjusting operation may be carried out under full load conditions or in other words, under the conditions prevailing in the actual use of the brakes on the road. It is also important that the correct percentage of predetermined pressure prevail relative to the percentage of pressure on the wheels with which the brakes are associated.

It is also highly important that the brakes on both wheels of a pair, that is to say, either the rear wheels or the front wheels of the vehicle, be adjusted alike and under similar load conditions and for this reason it is desirable to employ a pressure gauge in connection with the pedal depressor and also to provide means for indicating the relative pressure in connection with the adjustment on both wheels of the pair.

For depressing the brake pedal 10 of the vehicle, I provide an extensible member adapted to be interposed between the brake pedal and the front seat 12 of the vehicle.

The extensible member consists of a tubular member 14 having a screw threaded rod 16 threaded therein and projecting from its rear end. The rod 16 carries at its rear end, a pivoted head 18 adapted to engage the front face of the seat 12.

A cylinder member 20 is provided at its forward end with a V-shaped seat 22 adapted to fit over the brake pedal 10. The cylinder member 20 is provided with a bore 24 into which a piston or plunger 26 slidably extends.

The piston 26 is provided at its outer end with a socket 28 adapted to receive rotatably, the reduced end portion 30 of a shank 32 formed on the forward end of the tubular member 14. A screw 34 and a slot 36 serve to prevent removal of the piston 26 from the cylinder member 20 and this connection allows sliding movement of one relative to the other.

A flexible cup member 38 is mounted in the bore 24 and is held in position against the end of the piston 26 by a light coil spring 40.

The bore 24 is filled with oil 42, which, when the piston 26 is moved forwardly, is forced through a fitting 44 into the chamber of an oil pressure gauge 46.

The gauge 46 is provided with an indicator hand 48 movable to advanced position by increased pressure in the gauge and said indicator hand moves over the face of a dial 50. The piston 26 preferably is made one inch in area so that pounds per square inch read on the dial 50 will actually represent the pounds of pressure on the piston relative to the cylinder 20.

The tubular member 14 is provided with a cross head handle or operating means 52 for rotating it to advance the piston 26 in the cylinder or to permit said piston to retract and an anti-friction thrust bearing 54 preferably is mounted on the reduced portion 30 in contact with the end of said piston to facilitate the pressure exerting operation.

In connection with the pressure gauge I employ a second indicator hand 56 which may be referred to as an idler indicator hand, inasmuch as it is not directly affected by oil pressure in the gauge. The idler hand 56 is mounted on the inner end of the stub shaft 58 journaled in the transparent front wall 60 of the gauge.

The idler indicator hand 56 is located directly in front of the pressure indicator hand 48 and is engageable by a forwardly projecting pin 62 carried thereby in such manner that the idler hand is moved with the pressure indicator hand when the latter member is advanced by increased pressure in the gauge chamber.

Reverse movement of the pressure hand 48, however, does not affect the idler hand 56, which remains at the highest point of advance until returned by manual actuation.

The outer end of the stub shaft 58 is provided with a knob or head 64 by means of which the idler hand 56 may be manually positioned. A light coil spring 66 is mounted on the stub shaft 58 between the idler hand 56 and the wall 60 and serves to normally hold the idler hand in any given position to which it may be moved either manually or by the advance of the pressure hand 48.

In the operation of testing and adjusting automobile brakes, it is desirable to test the brakes under different load conditions or in other words, different degrees of pedal pressure. It is also of prime importance that the brakes have the same braking power on the wheels on each side of the automobile in order to prevent skidding, which would be caused by one brake having more braking power than the corresponding brake on the opposite side of the vehicle.

In the practical use of my improved pedal depressing device the extensible member is placed in position as shown and described, the V-shaped seat 22 engaging the brake pedal 10 and the head 18 engaging a relatively fixed portion of the vehicle, such as the front seat 12.

The tubular member 14 is then rotated by means of the handle 52 to exert a pressure on the brake pedal 10. The amount of this pressure is indicated on the dial 50 by the pressure hand 48 under the influence of the pressure set up in the cylinder 20 by the piston 26.

The initial amount of pressure applied to the brake pedal 10 by the extensible member as indicated by the gauge 46 should be substantially in accordance with the desirable amount of pedal pressure for easily and efficiently operating the brakes, which amount of pressure ordinarily would be about fifty pounds.

The workman then proceeds to test and adjust the brakes on one of the wheels of the vehicle by any suitable apparatus such as that disclosed in my companion applications hereinbefore referred to.

It will be understood that as the pressure indicator hand 48 advances under the influence of pressure set up in the gauge 46 as just described, the idler hand 56 also is advanced by engagement of the pin 62 and remains at a point on the dial 50 which indicates the amount of pedal pressure at which the first brake was tested and adjusted.

It will also be understood that during the operation of testing and adjusting the first brake, the pressure as indicated by the hand 48 of the gauge may decrease somewhat, thus permitting the indicator hand 48 to recede on the dial 50. This receding movement, however, will not affect the position of the idler hand 56 which will be held in its original position by the spring 66 and will continue to give the reading of the pedal pressure at which the operation was commenced.

The receding movement of the indicator hand 48 may be due to certain adjustments which may be made on the brake being operated upon, or upon the link connections between the pedal 10 and such brake in the case of sluggish brakes.

In the case of hydraulic brakes, the receding of the indicator hand 48 indicating a decrease of pressure on the pedal 10 may be due to a leakage in the cylinders or connecting tubes of the hydraulic brake system.

In any event, the difference of the position of the indicator hand 48 relative to the idler hand 56 will indicate that a reduction has occurred in the pedal pressure and will also indicate the amount or percentage of such reduction.

In addition to this, the position of the idler hand 56 will also indicate to the operator, the pedal pressure first selected for testing the first brake without the necessity of relying upon memory or resorting to the making of a memorandum as to such selected pedal pressure.

When the first brake of a pair has been tested and adjusted, the other brake of the pair may likewise be operated upon and in producing the desired pedal pressure for such operation, the workman will be guided by the position of the idler hand 56 in order to secure similar conditions of pedal pressure or load for the brakes of both wheels of the pair under consideration.

This operation may be repeated under different conditions of load or pedal pressure by further adjustment of the extensible member until satisfactory adjustment of both brakes of the pair is secured.

It will be apparent that I have provided a simple and yet a very efficient and economical construction for a device for carrying out my purpose and for enabling the operator to be sure that brakes are adjusted correctly and accurately and with the desired uniformity under different degrees of pedal pressure.

In the case of hydraulic brakes the device furnishes a very satisfactory and certain method of detecting leakage in the brake system. The extensible member may be positioned as shown and described and any desired pressure brought to bear upon the brake pedal 10 to move the indicator hands 48 and 56 relative to the dial 50.

By allowing the device to remain in such position for a time, the operator can easily tell whether any reduction in pressure is occurring by observing the indicator hand 48 and noting whether it recedes relative to the idler hand 56. If it does so recede, he can determine at a glance, the fact that there is a leakage in the system and also the amount or percentage of such leakage.

After any given test or observation, the idler hand 56 may be returned to normal position by manually turning the knob 64.

Some changes may be made in the construction and arrangement of the parts of my device without departing from the real spirit and purpose of my invention, and it is my intention to cover by my claims, any modified forms of structure or use of mechanical equivalents, which may be reasonably included within their scope.

I claim as my invention:

1. An extensible pedal depressing means comprising an internally threaded tubular member, a rod threadedly engaging in said tubular member, means at the outer end of said rod for engaging a stationary object, a cylinder having at one end a pedal-engaging seat, a piston movably mounted in said cylinder, a swivel connection between said piston and the tubular member, means for rotating said tubular member, a fluid in said cylinder, and a fluid pressure gauge communicating with said cylinder for indicating the amount of pressure exerted by the extensible means.

2. An extensible pedal depressing means comprising an internally threaded tubular member, a rod threadedly engaging in said tubular member, means at the outer end of said rod for engaging a stationary object, a cylinder having at one end a pedal-engaging seat, a piston movably mounted in said cylinder, a swivel connection between said piston and the tubular member, an anti-friction thrust bearing interposed between said tubular member and the piston, means for rotating said tubular member, a fluid in said cylinder, and a fluid pressure gauge communicating with said cylinder for indicating the amount of pressure exerted by the extensible means.

3. An extensible pedal depressing means comprising an internally threaded tubular member, a rod threadedly engaging in said tubular member, means at the outer end of said rod for engaging a stationary object, a cylinder having at one end a pedal-engaging seat, a piston movably mounted in said cylinder, a swivel connection between said piston and the tubular member, means for rotating said tubular member, a fluid in said cylinder, a spring in said cylinder for retracting said piston when pressure is released, and a fluid pressure gauge communicating with said cylinder for indicating the amount of pressure exerted by the extensible means.

4. A pedal depressing means comprising a pair of interengaging threaded members, means at the outer end of one of said members for engaging a stationary object, a cylinder having at one end a pedal-engaging seat, a piston movably mounted in said cylinder, a fluid in said cylinder, means for rotating one of said threaded members, one of said threaded members having an operative connection with said piston, and a fluid pressure gauge communicating with said cylinder for indicating the amount of pressure exerted by the extension of the threaded members.

ALFRED B. SEPPMANN.